United States Patent [19]
Selby

[11] Patent Number: 5,876,167
[45] Date of Patent: Mar. 2, 1999

[54] LOAD RESTRAINT WITH LONGITUDINAL AND TRANSVERSE STRINGERS

[75] Inventor: Ricky W. Selby, Danielson, Conn.

[73] Assignee: Keeper Corporation, North Windham, Conn.

[21] Appl. No.: 959,821

[22] Filed: Oct. 29, 1997

[51] Int. Cl.[6] .................................................. B60P 7/08
[52] U.S. Cl. ........................................... 410/97; 410/118
[58] Field of Search ................................ 410/96, 97, 100, 410/117, 118; 24/130, 265 CD; 296/100.15, 100.16; 87/2

[56] References Cited

U.S. PATENT DOCUMENTS

| | | | |
|---|---|---|---|
| 2,854,931 | 10/1958 | Campbell | 410/118 |
| 3,486,723 | 12/1969 | Harrison | 410/118 |
| 4,900,204 | 2/1990 | Summers | 410/97 |
| 5,203,655 | 4/1993 | Persau | 410/3 |
| 5,328,310 | 7/1994 | Lockney | 410/97 |
| 5,458,447 | 10/1995 | Clason | 410/100 |
| 5,682,652 | 11/1997 | Brody et al. | 24/130 X |

FOREIGN PATENT DOCUMENTS 404002534  1/1992  Japan ....................................... 410/97

*Primary Examiner*—Stephen T. Gordon
*Attorney, Agent, or Firm*—M. P. Williams

[57] ABSTRACT

A cargo restraint or net is formed of black longitudinal stringers 8, 9, yellow lateral stringers 10, 11 and a pair of yellow loops 12, 13 fastened to the stringers. Each end of the stringers has an adjustable jam cleat-type hook 18 thereon. Various net configurations are shown.

2 Claims, 3 Drawing Sheets

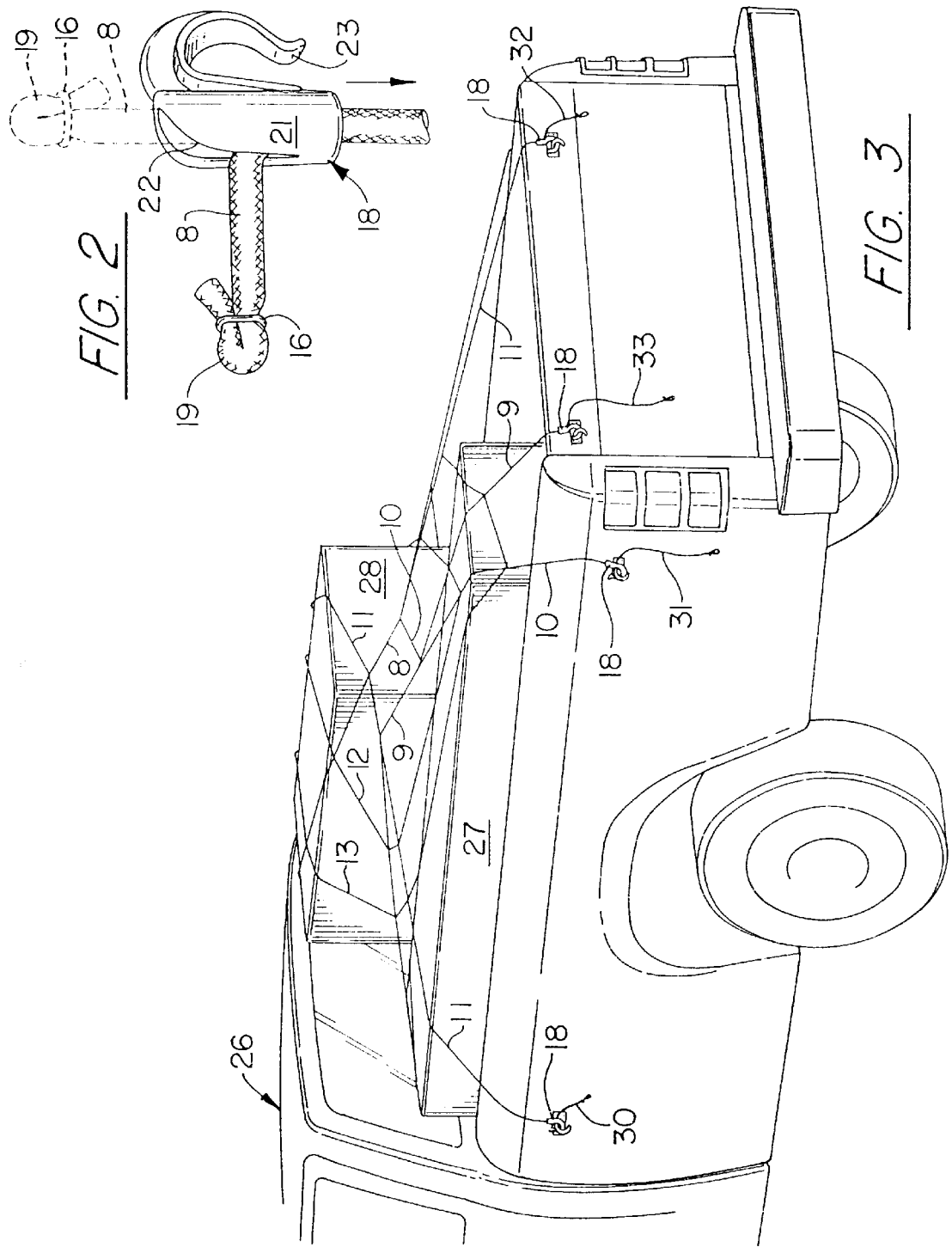

LOAD RESTRAINT WITH LONGITUDINAL AND TRANSVERSE STRINGERS

TECHNICAL FIELD

This invention relates to load or cargo nets or restraints formed of durable cord, having stringers which extend from front to back and from side to side.

BACKGROUND ART

A spider web shaped device for restraining cargo located in the bed of a truck or trailer is disclosed in U.S. Pat. No. 4,900,204. While that device is aesthetically appealing, it has numerous functional problems. First, it requires the use of a ring or a plate in the center of the restraint, which is heavy and which precludes load conformance in the region of the ring or plate. Second, the device is attachable to a truck or trailer only by means of its outer resilient loop, which therefore requires that the hooks, cleats or grommets to be used in conjunction therewith be suitably spaced. Third, the device is formed with a plurality of radial pieces which extend only half way across the dimension of the device, each radial piece being passed through the ring or plate, folded back on itself, and secured with a hog ring, and each radial piece being brought to the outer loop, bent 90°, and having its end secured to the outer loop with a hog ring. Thus, between the cleats or hooks on a truck or trailer and the center ring or plate, there are two hog rings that must directly withstand the stress when the device is stretched over a load. The hog ring joints are wear points, which limit the life of the device. Fourth, the variation in the size of loads which may be restrained with the device of the aforementioned patent is severely limited since the fastening by means of the outer loop of cord is a non-adjustable feature. Sixth, the suggested use of independent C-hooks to secure the outer loop to truck body parts is subject to the hooks falling off while the entire device is being installed, loss of the hooks between use, and so forth.

DISCLOSURE OF INVENTION

Objects of the invention include provision of a cargo restraint in which tension is transmitted from the restraint to the cargo carrying device such as a truck or trailer without passing through any in-line joint, such as a hog ring joint; provision of a cargo restraint which does not require a center ring or plate; provision of a cargo restraint which does not rely on its outer loop for anchoring to the cargo carrying device; and provision of a cargo restraint which does not require use of independent C-hooks.

Other objects of the invention include provision of a simple, durable, lightweight, highly versatile easy-to-use cargo restraint.

According to the present invention, a load or cargo net or restraint comprises a plurality of longitudinal stringers formed of durable cord, each extending from front to back, and a plurality of transverse stringers, each extending from side to side, each crossing said longitudinal stringers and fastened thereto, each of said stringers having a hook disposed thereon. In a preferred form, the invention is implemented with at least one loop of durable elastic cord crossing said stringers and fastened thereto and color coded bungee cord, and has adjustable hooks.

The invention provides a load or cargo net or restraint in which tension is transferred from the load supporting body on one side or end to the load supporting body on another side or end, directly, through single pieces of durable cord, without any intervening, inline joints, causing the restraint to be stronger and much more durable than restraints of the same general sort known to the prior art. The invention, by means of the hooks disposed on the stringers, makes it easy to properly secure a load, and the loss of independent hooks is avoided.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 2 is a side elevation view of an adjustable hook for use with the invention.

FIG. 3 is a perspective view of a truck bearing a load secured by a cargo net of the invention.

BEST MODE FOR CARRYING OUT THE INVENTION

Figure 1:
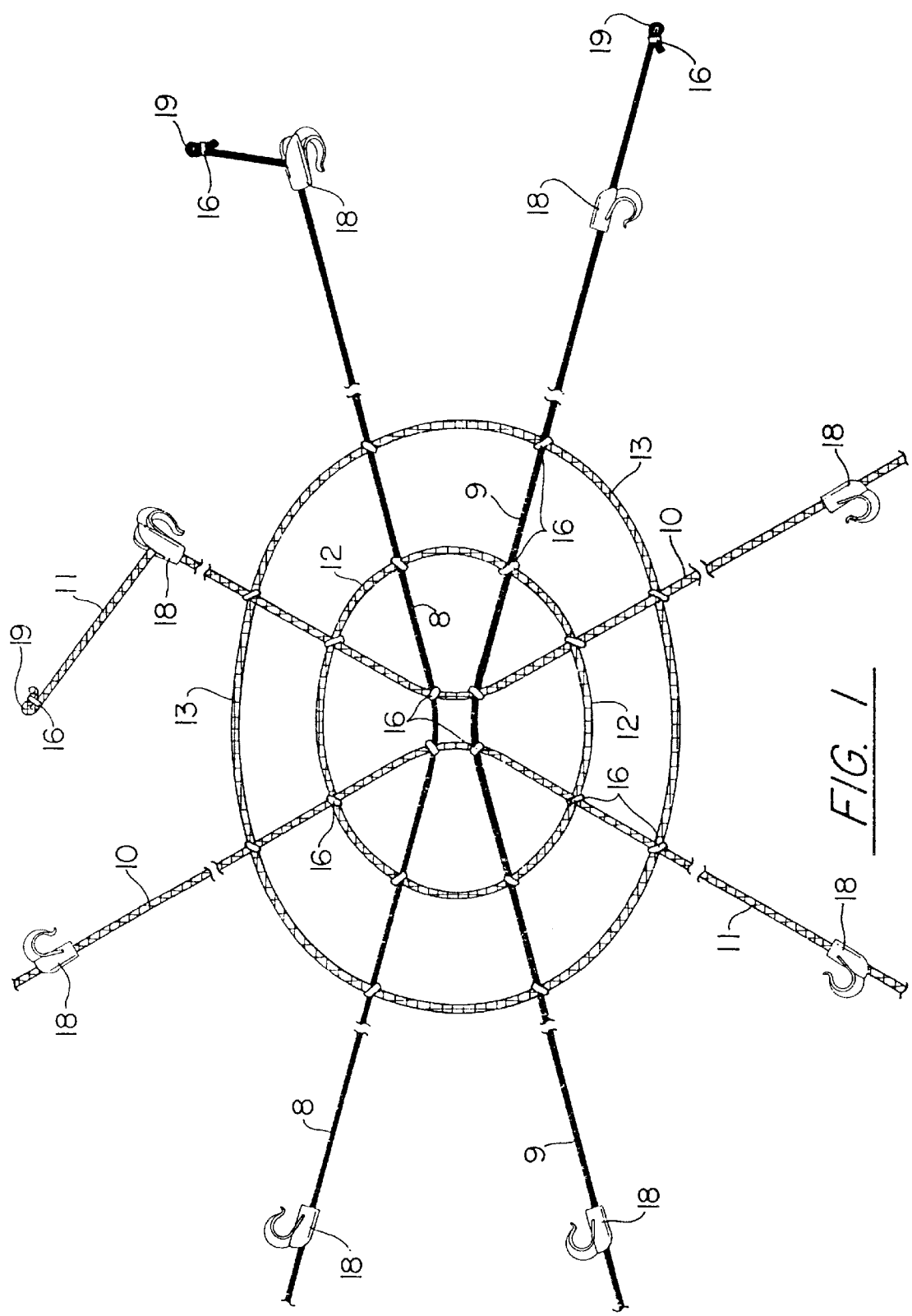
FIG. 1 is a plan view of a cargo net according to the invention.

Referring to FIG. 1, a cargo restraint of the invention is formed of durable cord and comprises a pair of longitudinal stringers 8, 9, a pair of transverse stringers 10, 11, and a pair of closed loops 12 13. The term "longitudinal" means the long way of a load, such as from front to back on a typical rectangular truck bed, and "transverse" means from side-to-side. The stringers and loops may preferably be made of high strength elastic cord, such as shock cord or bungee cord, the size of which may preferably be on the order of one quarter of an inch in diameter; of course, other sizes could be used. The stringers 8–11 are each connected at each point of crossing with each other and with the two loops 12, 13 by suitable attachment means, such as hog rings 16. Although not shown in FIG. 1, the loops 12, 13 may be formed by lapping the ends of a single piece and fastening them together by a suitable means, such as a hog ring. Each of the stringers has a clasp 18, which in a preferred embodiment comprises a jam cleat type of adjustable hook, which is prevented from sliding off the end of the stringer by means of a fist 19 formed by looping back the end of the stringer and fastening it to itself by any suitable attachment means, such as a hog ring 16. The fists 19 are shown in FIG. 1 only for the left ends of the stringers 8 and 9 and the upper end of the stringer 11, the ends of the remaining stringers having similar fists formed thereon.

In the preferred embodiment of the invention, the color of the longitudinal stringers 8, 9 is different from and contrasts with the color of the transverse stringers 10, 11. In FIG. 1, the stringers 8 and 9 are lined for the color black and the stringers 10 and 11, along with the loops 12 and 13, are lined for the color yellow.

The preferred clasps 18 are illustrated more clearly in FIG. 2. Each clasp 18 has a body 21 with a V-groove 22 therein, which forms a jam cleat, along with a hook 23 which is used to secure it to other hooks, eyes, edges, and the like. When the stringer 8 is in the position shown by dotted lines, the hook 18 will slide easily along the stringer. But when the stringer 8 is drawn into the V-groove 22 as shown in solid lines, the stringer becomes locked in the V-groove, for so long as tension is applied in the direction of the arrow in FIG. 2. Clasps with other types of jam cleats may be used.

FIG. 3 shows a pickup truck 26 having a pair of crates 27, 28 therein. The stringers 8, 9 are attached to hooks behind the cab and on the tailgate of the truck, and the stringers 10, 11 are attached to hooks on the side of the truck. Because the tall crate 28 is in the front of the truck, the stringer 11 is shown with a very short tail 30 extending out of the clasp 18 on the front left side of the truck, whereas the stringer 10 has a very long tail 31 extending out of the clasp 18 on the rear left side of the truck. Similarly, because the tall crate 28 is on the right side of the truck, the stringer 8 has a short tail 32 extending outwardly of the clasp 18 at the right end of the tailgate, while the stringer 9 has a very long tail 33 extending out of the clasp 18 at the left end of the tailgate. The restraint may be hooked on the underside of the truck body rails, or in any other suitable way.

FIG. 3 illustrates that the positioning of the clasps along the stringers is adjustable. The adjustability feature gives rise to additional advantages. First, when the load is in place and the net has been installed, the operator can proceed around the load and individually adjust tension in each of the stringers 8–11, regardless of the positioning of the net. This also allows adjusting net tension with respect to the bed of the truck in a fashion to accommodate variously shaped loads. An additional advantage of the adjustable feature is that it is not necessary to preposition the net in any sort of a careful manner, hooking the front of the longitudinal stringers 8 and 9 in any, roughly suitable fashion can usually be accommodated simply by adjustments made to the other ends of the stringers 8 and 9, and to both ends of the stringers 10 and 11. The adjustability feature is claimed in a commonly owned copending U.S. patent application, Ser. No. 08/960,027, filed on Oct. 10, 1997, now abandoned.

Figure 6:
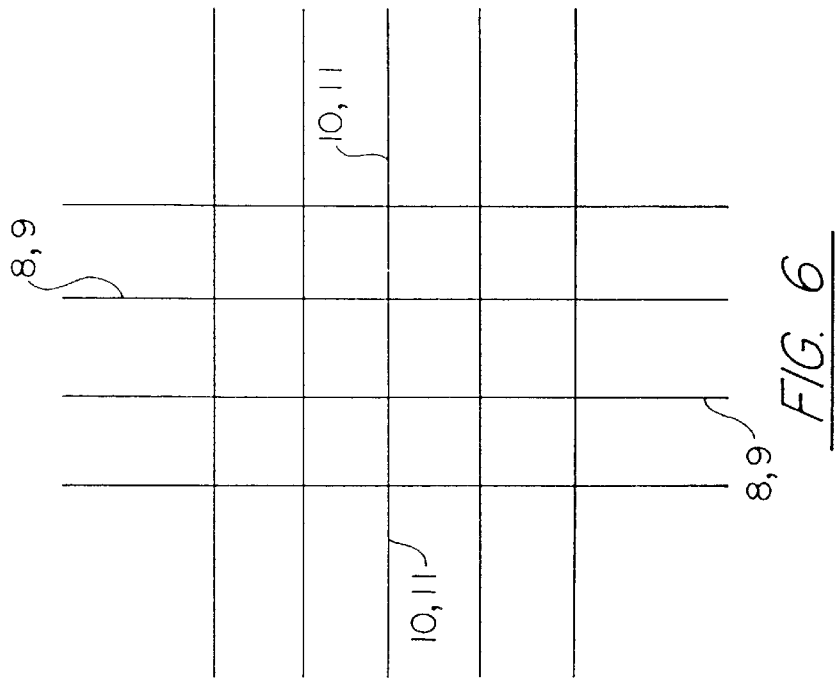
FIGS. 4–6 are stylized illustrations of alternative configurations for cargo restraints which may incorporate the present invention.
Figure 5:
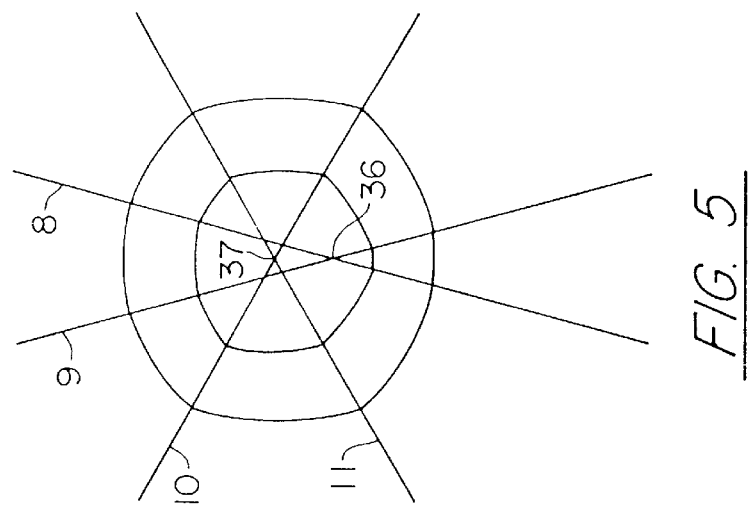

Although color is not shown in FIG. 3, it is obvious that the color of the preferred embodiment facilitates placing the net properly on the load, with the longest, black stringers 8 and 9 extending from front to back on the load, and with the shorter yellow transverse stringers 10, 11 positioned from side-to-side on the load. The color feature is claimed in a commonly owned copending U.S. patent application, Ser. No. 08/959,822, filed on Oct. 10, 1997. A feature of the invention is that each stringer extends from one anchor point (a clasp 18) across the load to another anchor point. Between one clasp 18 and the other clasp 18 there is nothing except a single, continuous piece of bungee cord. This contrasts with the prior art spider web in which each radial stringer is attached both at the center and at the outer loop by being lapped around a ring or the loop and joined to itself or the loop with a hog ring. In FIG. 1, the square formed between the stringers 8–11 is relatively small compared to the overall size of the cargo restraint. However, it is obvious that the stringers could be straightened up somewhat and the square made much larger by adjusting the point at which the various stringers are attached to one another. The restraint may have more stringers in either dimension or both. The restraint may have only one loop, when it is desired for the restraint to be simpler or smaller, or it may have three or more loops, when it is desired for the restraint to be larger or stronger. Similarly, various other configurations of one or more loops with four or more stringers can be utilized with the invention, as are shown in FIGS. 4–6, wherein the hog rings 16, the hooks 18 and fists 19 are not shown.

Figure 4:
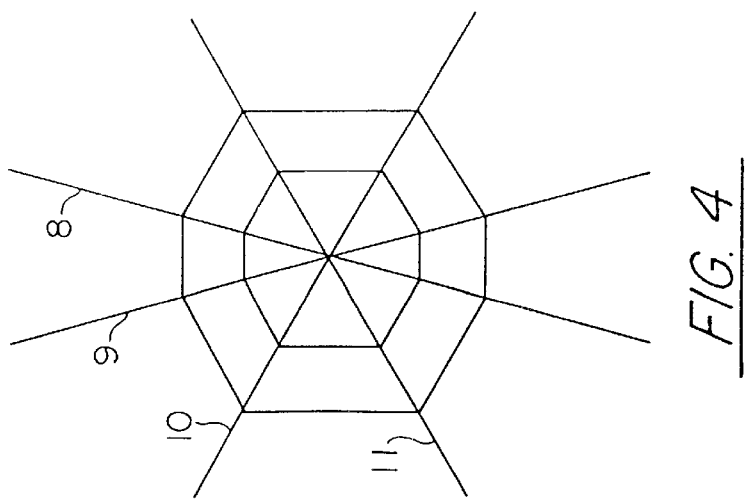

FIG. 4 illustrates a configuration like that of FIG. 1 except that all of the stringers 8–11 cross each other at a central point. FIG. 5 is similar to FIG. 4 except that the stringers 8, 9 cross each other at a first point 36 and the stringers 10, 11 cross each other at a point 37 which is displaced longitudinally from the point 36 to facilitate fastening no more than two cords together at any one point. Of course, the configuration could be with the longitudinal stringers 8, 9 crossing each other as in FIG. 4 while the transverse stringers 10, 11 do not cross each other, as in FIG. 1, or vice versa. FIG. 6 illustrates a configuration having only stringers, and no loops. All of these configurations are irrelevant to the present invention, which simply comprises having each of the stringers extend completely through the net, from one point of anchoring the net on one side of the load to a point of anchoring the net on an opposite side of the load.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A cargo restraint for securing cargo to a cargo supporting device, comprising:

a net having two ends and two sides and including a plurality of longitudinal stringers formed of durable cord extending between said ends, a plurality of transverse stringers crossing said longitudinal stringers, and attachment means for attaching said longitudinal stringers to said transverse stringers where said transverse stringers cross said longitudinal stringers;

at least one loop of durable cord contacting all of said stringers and fastened thereto where they contact; and a clasp disposed on each end of each of said stringers, each comprising a hook for securing the related end of a corresponding stringer to said cargo supporting device.

2. A cargo restraint according to claim 1 wherein said stringers and said loop are formed of durable, elastic cord.

* * * * *